Feb. 24, 1925.
C. M. GILT
1,527,641
DYNAMO ELECTRIC MACHINE PROTECTIVE SYSTEM
Filed June 14, 1922
2 Sheets-Sheet 1
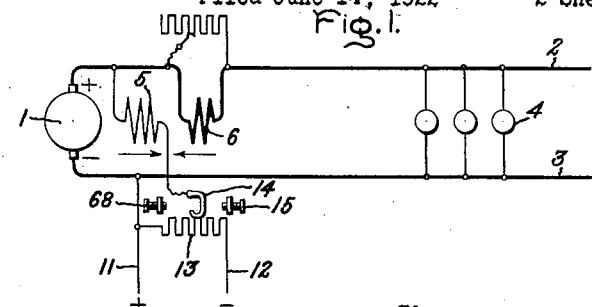
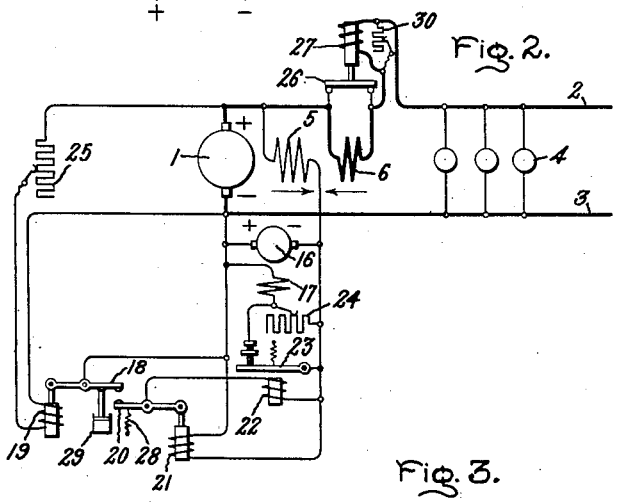
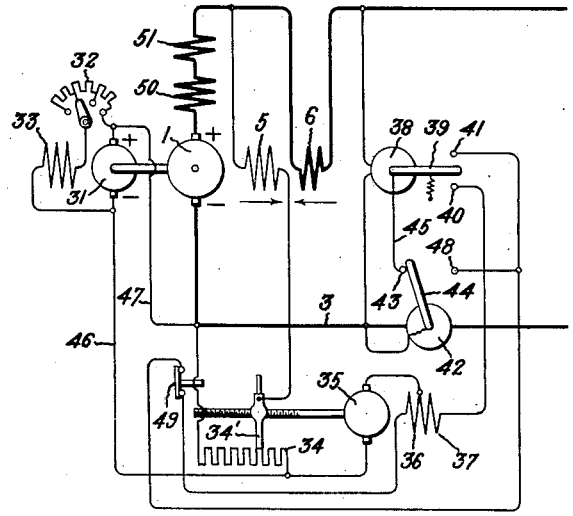
Inventor:
Carl M. Gilt,
by Albert G. Davis
His Attorney.

Feb. 24, 1925.
C. M. GILT
1,527,641
DYNAMO ELECTRIC MACHINE PROTECTIVE SYSTEM
Filed June 14, 1922   2 Sheets-Sheet 2
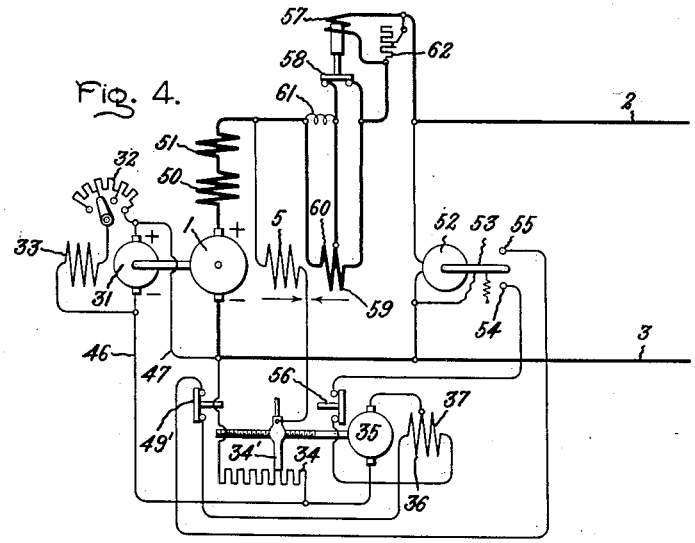
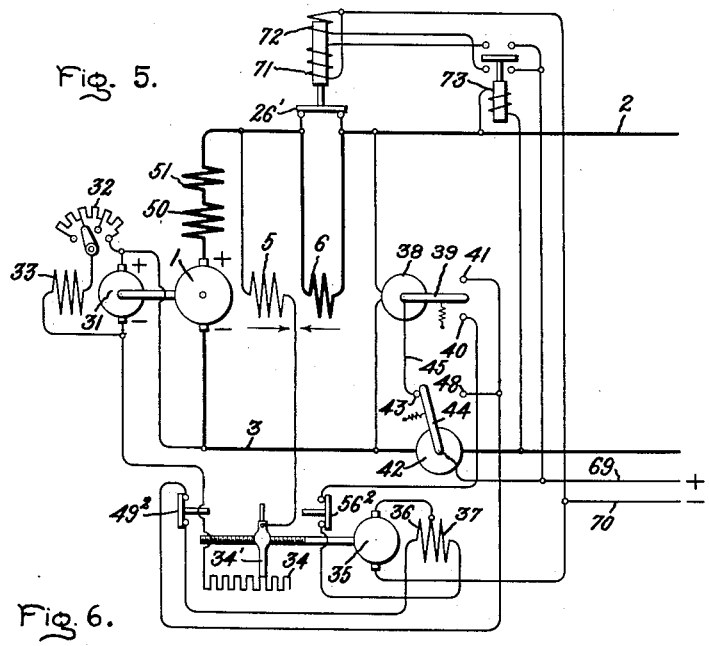
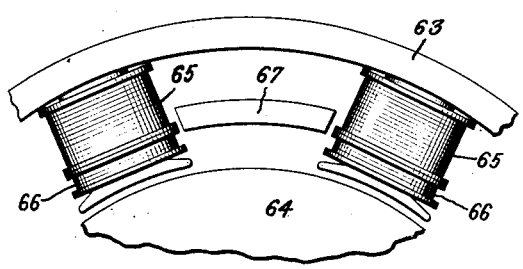
Inventor:
Carl M. Gilt,
by Allred S. Dent
His Attorney Patented Feb. 24, 1925.

1,527,641

UNITED STATES PATENT OFFICE.

CARL M. GILT, OF SCHENECTADY, NEW YORK, ASSIGNOR TO GENERAL ELECTRIC COMPANY, A CORPORATION OF NEW YORK.

DYNAMO-ELECTRIC MACHINE PROTECTIVE SYSTEM.

Application filed June 14, 1922. Serial No. 568,186.

*To all whom it may concern:*

Be it known that I, CARL M. GILT, a citizen of the United States, residing at Schenectady, in the county of Schenectady, State of New York, have invented certain new and useful Improvements in Dynamo-Electric Machine Protective Systems, of which the following is a specification.

This application is a continuation in part of my prior application Serial No. 406,048, filed August 26, 1920.

My invention relates to the control of dynamo electric machines and particularly to means for protecting direct current generators against overload and against flashover in case of short circuit without the use of circuit breakers or similar apparatus.

An object of my invention is to provide a simple and reliable control arrangement adapted for use in railway work and power work generally, and particularly adapted for use in automatic substations where repeated or continued short circuits may be encountered and where it is desirable that the machine remain connected to the line circuit.

A further object of my invention is to provide an improved control arrangement which shall enable the voltage of the machine to be controlled to maintain any desired voltage characteristic as long as the current output of the machine is below a predetermined value, and which shall act to give the machine a constant current characteristic when the load current tends to exceed the predetermined value.

A further object of my invention is to provide a control arrangement for limiting the current, which arrangement will permit quick changes in flux to take place thereby preventing flashover due to sudden short circuits.

A further object of my invention is to provide a control arrangement for the purpose described which shall act quickly to build up the generator voltage upon a reversal of current following removal of a short circuit.

My invention will be better understood from the following description taken in connection with the accompanying drawings, and its scope will be pointed out in the appended claims.

In the accompanying drawings, Fig. 1 diagrammatically represents one embodiment of my invention; Fig. 2 represents a further embodiment in which a vibratory regulator of the Tirrill type is used; Fig. 3 represents an embodiment in which the voltage is controlled by a contact-making voltmeter arranged in cooperative relationship with a contact-making ammeter; Fig. 4 represents an embodiment containing modifications of the arrangement of Fig. 3; Fig. 5 represents a further embodiment of my invention; and Fig. 6 represents a structural arrangement of the generator to enable quick changes in flux to take place.

Like reference numerals are used throughout the specification and drawings to designate like parts.

In Figs. 1 to 5 of the drawings, there is shown a direct current generator having an armature 1 which is driven at substantially constant speed in any desired manner, as for example by an electric motor (not shown), and which is arranged to supply a load circuit represented by mains 2 and 3, across which a load, diagrammatically indicated at 4, is connected. This load may be of any desired character and may consist for example of a distribution network or of motors arranged to drive railway vehicles. This generator is designed to deliver substantially constant potential when it is operating under normal conditions. By this I mean that if no unusual conditions occur on the load circuit, the potential of the machine will not vary any more than that due to the voltage drop in the line and machine, or in certain cases the potential of the generator may be made to rise by a suitable regulator as the load on the machine increases from no load to full load. The excitation of the generator, however, is arranged so that if a short circuit occurs on the load circuit, or if conditions approaching such a short circuit occur, the voltage of the generator will decrease to such an amount that the generator will deliver a current which will be of a predetermined value. Preferably, this predetermined value of current which will be delivered by the generator under such unusual conditions will be substantially full load current, that is, in the neighborhood of 110% of full load current. In order that the excitation of the generator be such as to bring about these conditions, I provide it with field windings 5 and 6 normally opposing each other and arranged to produce under short circuit conditions only sufficient resultant ampere turns necessary to overcome the internal voltage drop in the armature and connections of the machine when the machine is delivering the above mentioned predetermined current.

In the drawings, field winding 5 is shown as excited from across the terminals of the generator and also from a source of electromotive force independent of said machine. The field winding 6 is excited in proportion to the current delivered by the machine, but in a direction opposed to that of the field winding 5, and is connected in series with said line circuit.

In Fig. 1, the independent source of electromotive force is indicated by the direct current leads 11 and 12 connected to the resistance 13. One terminal of the winding 5, which I shall call a shunt winding although it is also excited by a separate source of electromotive force, is connected to the adjustable contact 14 which is arranged to cooperate with the resistor 13 to enable any desired value of auxiliary electromotive force to be inserted in series with the shunt field winding 5. The auxiliary electromotive force impressed on this winding should be in the same direction as the electromotive force impressed by the machine upon the winding 5. The adjustable stop 15 is provided to limit the value of auxiliary electromotive force which may be inserted in the circuit of the shunt field winding, and the stop 68 is provided to prevent the source of auxiliary electromotive force from being completely cut out of the circuit of field winding 5.

The operation of the arrangement shown in Fig. 1 is as follows: As the load on the generator increases, the series winding 6 tends to decrease the field flux of the generator and, therefore, the voltage of the machine. Within the limits of the capacity of the machine, this drop in voltage may be overcome by increasing the excitation of the machine by operation of the arm 14 of the rheostat and thus increase the auxiliary excitation of the winding 5. The stop 15 is adjusted so that it is engaged by the arm 14 when the desired limit of the capacity of the machine is reached. Any further increase in load will increase the opposing action of the series field winding 6 with no compensating increase in the shunt field winding 5. The voltage of the generator will therefore be reduced and the current output of the generator limited. If the load decreases, the magnetomotive force of the series field winding 6 will decrease and the voltage of the generator will rise. The result obtained, therefore, is that, when any load predetermined by the setting of the stop 15 is reached, the machine becomes substantially a constant current generator.

If the load tends to increase beyond the predetermined load, which as pointed out above is preferably substantially full load, the field winding 5 is so designed that its number of ampere turns due to its excitation from the separate source and from across the terminals of the machine is equal to the opposing ampere turns of series field winding 6 plus a number of ampere turns sufficient to give the necessary voltage to overcome the internal voltage drop in the generator and its connections at the same predetermined current. In other words, the generator produces just sufficient voltage under these conditions to force the predetermined current through the load circuit. If the load circuit is short circuited, the voltage of the machine across its terminals would be practically zero, but the current delivered by the machine would still remain at the predetermined value. The machine is thus prevented from taking an excessive load even under conditions of short circuit. Since the differential series winding 6 carries the line current, this winding is immediately affected by increases in current, and the system is therefore effective to prevent overloads even in case of repeated or continued short circuits. The arrangement is, therefore, well adapted for use in automatic substations in which it is desirable that the machine be kept connected to the load. With this arrangement, it is unnecessary to use circuit breakers, flash-over guards or other similar protective devices, which are customarily used with machines arranged for this class of service. In such automatic substation work, the means for controlling the strength of the shunt field winding 5 will ordinarily be made automatic to control the voltage characteristic of the machine. Such automatic regulators will be hereinafter described. In the event that other generators are connected to the mains 2 and 3, any tendency of the line current to reverse through the winding 6, upon the removal of a short circuit, will build up the generator voltage until a balance is reached, since the reverse flow of current will cause the winding 6 to assist the action of the shunt field winding 5.

Fig. 2 shows an embodiment of my invention in which automatic means are provided for controlling the voltage of the auxiliary source of electromotive force in accordance with the voltage of the machine. In this figure, the auxiliary source of electromotive force is represented as an exciter 16 provided with a shunt field winding 17. The excitation of the winding 17 is controlled by a vibratory regulator of the Tirrill type comprising a contact 18 controlled by a winding 19 connected across the terminals of the machine. A cooperating contact 20 is arranged to be controlled by a coil 21 connected across the terminals of the exciter 16. The contacts 18 and 20 control the circuit of a relay comprising a coil 22 connected across the exciter terminals, and the vibrating contact arm 23 of the relay is arranged to control a shunt circuit about the adjustable resistor 24 in the circuit of the exciter shunt field winding 17. This regulator may be any well-known form of the Tirrill type of regulator and acts to maintain the generator voltage constant in a manner well known to those skilled in the art. In operation, the relay armature 23 is continually vibrating. When the resistor 24 is short circuited, the exciter voltage is increased, and when this short circuit is removed the exciter voltage falls. The relative duration of the periods of engagement and disengagement of the short circuiting contacts of the relay determine the voltage of the exciter and thereby the voltage of the generator. An adjustable resistance 25 may be provided in the circuit of winding 19 to enable the voltage of the generator to be adjusted at any desired value. As is well known to those skilled in the art, a winding in series with the line circuit may be added to cooperate with the winding 19 to impart any desired voltage characteristic to the generator. It is also apparent that the winding 19 may be connected to any point of the line circuit 2, 3 at which it is desired to maintain a certain voltage. In Fig. 2, I have shown a contactor comprising a switch 26 controlled by coil 27 in series with the line circuit. The contactor is arranged normally to shunt the winding 6. When a predetermined value of line current is reached, the coil 27 operates the switch 26 to remove the shunt from the winding 6 and thereby render the winding more effective to reduce the voltage of the generator.

The operation of the arrangement shown in Fig. 2 will be apparent to those skilled in the art. An increase in voltage causes the winding 19 to lift its core and move the contact 18 into engagement with the contact 20. This engagement completes the circuit of relay coil 22 which attracts the armature 23 and inserts a resistor 24 into circuit with the exciter field winding 17 to reduce the exciter voltage and thereby weaken the shunt field winding 5. This reduction in the exciter voltage weakens the coil 21 of the regulator permitting the spring 28 to separate the contact 20 from the contact 18. The lowering of the voltage of the generator 1 also weakens the coil 19 to separate the contact 18 from the contact 20. The separation of contacts 18 and 20 restores the relay armature 23 to the position where it short circuits the resistor 24 to raise the exciter voltage. In operation, the dash-pot 29 causes the contact 18 to assume a mean position dependent upon the generator voltage and the contact 20 controlled by the exciter voltage vibrates into and out of contact with the contact 18. I adjust the resistor 24 so that the maximum voltage of the exciter 16 is limited to any desired value. This maximum voltage occurs when the contacts 18 and 20 remain separated and the resistor 24 continuously short circuited. Beyond this point the differential series winding 6 is effective to reduce the voltage of the generator without any compensating increase in the exciter voltage. If the contactor controlled by the line current were omitted the winding 6 would be continuously operative as in Fig. 1. In order to limit the regulating action required of the exciter, however, I have arranged the line contactor to reduce the effect of winding 6 with currents below a predetermined value, which value may be adjusted by varying the adjustable resistance 30 in shunt with the coil 27. Whenever the predetermined current output is reached, the winding 6 is immediately inserted and rendered effective to lower the generator voltage and maintain a reduced voltage as long as the current remains at the predetermined value. As soon as the current falls below this value, the contactor again short circuits the differential winding. The system of Fig. 2 therefore acts to vary the regulating characteristic of the generator from substantially constant voltage to constant current at a predetermined load in the same way as the system described in connection with Fig. 1.

Fig. 3 shows a further embodiment of my invention in which the exciter 31 is represented as mounted on the shaft of generator 1. The exciter in this case is represented as a constant voltage machine, the voltage of which may be adjusted by the rheostat 32 connected in the circuit of the shunt field winding 33. The exciter is connected across the terminals of the resistor 34 which corresponds to the resistor 13 of Fig. 1. In this case the value of the auxiliary exciting electromotive force is adjusted by the pilot motor 35 provided with the reversely connected field windings 36 and 37. A contact-making voltmeter 38 is connected across the mains 2, 3 and upon a decrease in line voltage the contact arm 39 of the voltmeter engages the contact 40 to complete the circuit of the pilot motor through the winding 37 to operate the contact 34' to the right to increase the auxiliary exciting electromotive force. Upon an increase in voltage the contact 39 engages the contact 41 to complete a circuit through the oppositely wound winding 36 to operate the pilot motor in the other direction. A contact-making ammeter 42 is provided in the main 3 and this meter is adjusted in any well known manner, as for example by an adjustable shunt, to maintain the contact 43 closed for all currents below a predetermined value. It will be observed that the circuit of the pilot motor leads from the main 3 through contact arm 44 of the contact-making ammeter through the connection 45 to the contact arm 39 of the contact-making voltmeter. The circuit of the pilot motor is completed from arm 39 through one of the windings 36 or 37, the armature 35 and the line 46 to one terminal of the exciter, the other terminal of the exciter being connected through the line 47 to the main 3. As thus arranged, the operation of the contact-making voltmeter to raise the voltage by engagement of arm 39 with contact 40, is dependent upon the engagement of arm 44 with contact 43. Whenever the line current reaches the predetermined value, contact arm 44 leaves contact 43, thus rendering the contact-making voltmeter inoperative further to increase the generator voltage. If desired, a contact 48 may be provided on the contact-making ammeter arranged to be engaged by the contact arm 44 at any predetermined current, and this contact is arranged to operate the pilot motor in a direction to reduce the generator voltage. To accomplish this purpose, the contact 48 is shown connected to the contact 41 so that the circuit of the pilot motor through winding 36 may be completed at either contact 41 or contact 48. A limit switch 49 is shown in the circuit of winding 36 to open the circuit of the pilot motor when the contact arm 34' approaches its extreme left-hand position where the value of the auxiliary exciting electromotive force in the circuit of the shunt field winding 5 is substantially reduced. Obviously, this limit switch is set to open so as not to reduce the auxiliary exciting electromotive force in circuit to such a value that the machine will not readily build up when the current falls below the predetermined value. In any of the embodiments of my invention, compensating and commutating windings may be applied to the main generator and in Fig. 3 a compensating winding for neutralizing the armature reaction to any desired extent is indicated at 50 and the commutating winding for reducing sparking at the brushes is indicated at 51.

The operation of the arrangement shown in Fig. 3 will be apparent from the preceding description. The contact-making voltmeter 38 operates to maintain the generator voltage constant until any predetermined output has been reached, after which this voltmeter is rendered inoperative to increase the voltage, and the contact-making ammeter 42, at a predetermined load, will operate to assist the differential winding 6 in lowering the voltage of the generator.

The embodiment of my invention shown in Fig. 4 differs from the arrangement shown in Fig. 3 in the omission of the contact-making ammeter and the provision of other means for limiting the action of the pilot motor in increasing the shunt field excitation. The arrangement also comprises a contactor controlled by the line current for controlling a shunt around a portion of the series field winding. In this embodiment, the contact-making voltmeter 52 is arranged to move the arm 53 to engage the contact 54 upon a fall in voltage to complete the circuit of the pilot motor through the winding 37 to operate the same in a direction to increase the auxiliary exciting electromotive force in circuit. Upon an increase in voltage, arm 53 engages contact 55 to complete the pilot motor circuit through winding 36 to operate the contact arm 34' to reduce the auxiliary exciting electromotive force. A limit switch 49' is provided in the circuit of winding 36 to perform the same function as the limit switch 49 of Fig. 3. The operation of the regulator to increase the excitation of the shunt field winding 5 is limited by the limit switch 56 in the circuit of winding 37. The maximum value of the auxiliary exciting electromotive force which may be put into circuit may be limited either by adjustment of the position of limit switch 56 or by adjustment of the rheostat 32 in the field of the exciter 31. A contactor comprising a coil 57 and a contact 58 is arranged to control a shunt circuit around a portion 59 of the differential series field winding, the other portion 60 of which is arranged to be connected permanently in circuit. An inductive resistance 61 is shown in shunt with the portion 60 of the differential series winding to increase the sensitiveness of the action of this winding upon sudden changes in current. An adjustable resistance 62 may be provided in shunt with the coil 57 to adjust the action of this coil.

The arrangement shown in Fig. 4 operates to maintain constant voltage on the generator through the action of the contact-making voltmeter 52. The portion 60 of the differential series field winding 6 being continually in circuit tends to lower the voltage with an increase of line current, but this action is compensated by the action of the voltage regulator. The additional shunt excitation required is not great, however, for the reason that the amount of series field winding, that is continuously effective, is but a portion of the total winding which may be brought into action under abnormal conditions. Inasmuch as the shunt 61 for the portion 60 of the differential winding is inductive, any change of current in the line circuit will produce a proportionally greater change of current in the series field winding thereby increasing the quickness and sensitiveness of the regulation for rapid current changes. When the predetermined limit of load upon the machine has been reached, the limit switch 56 is opened to prevent the contact-making voltmeter from further increasing the shunt field excitation. If, at any time, the current output reaches the predetermined desired value the contactor removes the shunt from the portion 59 of the series field winding 6 rendering this winding effective to lower the voltage as in the arrangement shown in Fig. 2. It is obvious that, if desired, the contactor controlled series field shunting circuit of Figs. 2 and 4 may include a resistance which may be either inductive or non-inductive to render this winding operative to any desired extent while the current is below the predetermined value for which the contactor is adjusted.

The embodiment of my invention shown in Fig. 5 contains certain features of Figs. 2, 3 and 4, but differs from all of these figures in that the exciter 31 is connected directly in the circuit of the field winding 5 and the resistor 34 acts as a variable resistor in the field circuit of field winding 5, as will be hereinafter explained. The arrangement also embodies a contactor or circuit breaker comprising a switch 26' and coils 71 and 72. This contactor is arranged normally to shunt the winding 6 and operates to remove the shunt when the current output reaches the predetermined value, as will be hereinafter described. Upon a predetermined increase in line current, the coil 72 operates the switch 26' to remove the short circuit from the winding 6 and thereby render the winding 6 effective to reduce the voltage of the generator. The exciter in this arrangement is also a constant voltage machine, the voltage of which may be adjusted by the rheostat 32 connected in the circuit of the shunt field winding 33. In this case, the value of the auxiliary source of electromotive force, represented by the exciter 31 in the circuit of the field winding 5, is substantially constant, but the excitation of the field winding is varied by the resistor 34, which is adjusted by the pilot motor 35 having the reversely connected field windings 36 and 37. The pilot motor 35, which may be supplied from any constant source, is here shown as being supplied with current from an independent source. A contact making voltmeter 38 is connected across the mains 2, 3, and upon a decrease in line voltage, the contact arm 39 of the voltmeter engages contact 40 to complete the circuit of the pilot motor through the winding 37 to operate the contact 34' to the left to decrease the amount of the resistor 34 included in the circuit of field winding 5, and thereby tend to maintain the voltage of generator 1 substantially constant. Upon an increase in voltage, the contact 39 engages the contact 41 to complete a circuit through the oppositely wound winding 36 to operate the pilot motor in the other direction.

A contact making ammeter 42 is provided in the main 3, and this meter is adjusted in any well known manner, as for example by an adjustable shunt to maintain the contact 43 closed for all currents below a predetermined value. It will be observed that the circuit of the pilot motor leads from one side of the independent source through line 69 to contact arm 44 of the contact making ammeter through the connection 45 to the contact arm 39 of the contact making voltmeter. The circuit of the pilot motor is completed from arm 39 through one of the windings 36 or 37, through the armature 35 and the line 70 to the other side of the independent source. As thus arranged, the operation of the contact making voltmeter to raise the voltage by engagement of arm 39 with contact 40 is dependent upon engagement of arm 44 with contact 43. Whenever the line current reaches the predetermined value, contact arm 44 leaves contact 43, thus rendering the contact making voltmeter inoperative to further increase the generator voltage. If desired, a contact 48 may be provided on the contact ammeter arranged to be engaged by the contact arm 44 at the predetermined current, this contact being arranged to operate the pilot motor in a direction to reduce the generator voltage, as described in connection with Fig. 3. The limit switch 49² is provided in the circuit of winding 36 to perform the same function as the limit switch 49 of Fig. 3, and the limit switch 56² is also provided to perform the same function as the limit switch 56 in Fig. 4. If at any time the current output reaches the predetermined value, which means that the voltage of the machine is reduced, the voltage relay 73 connected across the mains 2, 3 drops, energizes coil 72 of the contactor, and removes the shunt from the series field winding 6, rendering this winding fully effective to lower the voltage as heretofore explained. When the current is again reduced, which means that the voltage of the machine has again become normal, the relay 73 rises, energizes coil 71 and closes the shunt around the series field winding 6, shunting most of the current therefrom. By making 73 a voltage relay, contactor 26' is open whenever the load conditions are abnormal so as to cause the generator to operate at voltages below normal. By this means the generator is given maximum stability and will meet sudden changes in the load resistance with a minimum change of current.

The operation of the arrangement shown in Fig. 5 will be apparent from the preceding description. The contact making voltmeter 38 operates to maintain the generator voltage substantially constant until any predetermined output has been reached, after which this voltmeter is rendered inoperative to increase the voltage, and the contact-making ammeter 42, at a predetermined load, will operate at the same time that the contactor 26′ operates to remove the shunt around the series field winding 6 and assist the series field winding 6 in lowering the voltage of the generator, the machine becoming a substantially constant current generator. The contact-making ammeter 42 may be set to operate at different current values than contactor 26′. The contact-making ammeter alone will tend to adjust the current to the predetermined value, but does so with a certain time delay depending upon the speed of operation of the rheostat 34. The differential series field 6, however, when the contactor 26′ opens, reduces the voltage and current almost instantaneously following a decrease in the load resistance.

In order to obtain quick changes in the flux and consequently prevent flashing due to sudden short circuits, the series field winding should be placed as near to the pole tips as possible. This arrangement is indicated in Fig. 6, where 63 represents the field yoke of a dynamo electric machine and 64 the armature. The shunt field windings are indicated at 65 and the differential series windings at 66. The flux change may be made still more rapid by providing a magnetic shunt between the poles placed between the series winding and the yoke. Such a magnetic shunt is diagrammatically represented at 67 in Fig. 6. As thus arranged, when a sudden increase in the load builds up a series magnetomotive force opposing the shunt magnetomotive force, the flux in the field frame need not change suddenly in value but may be shifted from its path through the armature to a path through the magnetic shunt 67. In this way a very rapid decrease in the flux through the armature may be produced and the generator voltage may in consequence be changed very quickly. An air gap should be provided between the poles and the magnetic shunt so as to limit the leakage flux under normal operating conditions.

My invention operates advantageously where the generator is the only source connected to the distribution system, and it is also of very great advantage where other sources of supply not provided with my invention are also used to supply the net work. Where, for example, the distribution circuit is so large that the normal load resistance is so low as to correspond practically to a short circuit for one of the units if it alone were supplying the system, it is not always possible to burn off short circuits in the system, with the result that the whole system is shut down. When such a system is once shut down, it is very difficult to get it into operation again, for the reason that the first generator connected to the system will be placed on what is practically a short circuit. Where the entire system has been put out of operation in this manner, it has sometimes been necessary to disconnect various portions of the net work before it has been possible to get the system into operation again. When, however, the system comprises one or more generators embodying my invention, these generators embodying my invention will in case of short circuit continue to supply their full load current which will assist in burning off the short circuit, and when the short circuit clears, the other source of supply, if used, may be again connected to the net work without difficulty.

In accordance with the provisions of the patent statutes, I have described the principle of operation of my invention together with several embodiments thereof which may be used to carry it into practice, but it will be apparent to those skilled in the art that various modifications may be made within the spirit of my invention, and I, therefore, desire in the appended claims to cover all such variations and modifications as fall within the scope of my invention, which is defined in the appended claims.

What I claim as new and desire to secure by Letters Patent of the United States, is:—

1. A system of electrical distribution comprising a line circuit subject to short circuit conditions, a substantially constant speed dynamo electric machine arranged to supply current to said line circuit normally at substantially constant potential, said machine being provided with a shunt winding and a differential winding in series with said line circuit, characterized by the fact that means are provided for controlling the excitation of said shunt winding arranged so that the maximum value of shunt excitation which may be obtained with said differential winding effective is such as to maintain the output of the machine at a predetermined value, whereby damage from flashover and overload is prevented.

2. A system of electrical distribution comprising a line circuit subject to short circuit conditions, a substantially constant speed dynamo electric machine arranged to supply current to said line circuit normally at substantially constant potential, said machine being provided with a shunt winding and a differential winding in series with said line circuit, and means for regulating the excitation of said shunt winding in accordance with the voltage of the system, characterized by the fact that said regulating means is arranged to limit the maximum value of shunt excitation which may be obtained with said differential winding effective, to prevent damage from repeated and continued short circuits.

3. A system of electrical distribution comprising a line circuit subject to short circuit conditions, a substantially constant speed dynamo electric machine arranged to supply current to said line circuit normally at substantially constant potential, said machine being provided with field windings normally opposing each other and arranged to produce under short circuit conditions only sufficient resultant ampere turns to generate a voltage in said machine necessary to overcome the internal voltage drop in the armature and connections of the machine when the machine is delivering a predetermined current.

4. A system of electrical distribution comprising a line circuit subject to short circuit conditions, a substantially constant speed dynamo electric machine arranged to supply current to said line circuit normally at substantially constant potential, said machine being provided with field windings normally opposing each other and arranged to produce under short circuit conditions only sufficient resultant ampere turns to generate a voltage in said machine necessary to overcome the internal voltage drop in the armature and connections of the machine when the machine is delivering substantially full load current.

5. A system of electrical distribution comprising a line circuit subject to short circuit conditions, a substantially constant speed dynamo electric machine arranged to supply current to said line circuit normally at substantially constant potential, said machine being provided with field windings, one portion of said windings being in series with said line circuit and connected to normally oppose another portion, the ampere turns of said other portion of said windings when said machine is operating under short circuit conditions being so proportioned as to be substantially equal to the ampere turns of said series connected portion at a predetermined current plus the ampere turns necessary to generate a voltage in said machine to overcome the internal voltage drop in the armature and connection of said dynamo electric machine at the same predetermined current.

6. A system of electrical distribution comprising a line circuit subject to short circuit conditions, a substantially constant speed dynamo electric machine arranged to supply current to said line circuit normally at substantially constant potential, said machine being provided with field windings, one portion of said windings being in series with said line circuit and connected to normally oppose another portion, the ampere turns of said other portion of said windings when said machine is operating under short circuit conditions being so proportioned as to be substantially equal to the ampere turns of said series connected portion at substantially full load current plus the ampere turns necessary to generate a voltage in said machine to overcome the internal voltage drop in the armature and connections of said dynamo electric machine at substantially full load current.

7. A system of electrical distribution comprising a line circuit subject to short circuit conditions, a substantially constant speed dynamo electric machine arranged to supply current to said line circuit normally at substantially constant potential, said machine being provided with field windings excited from across the terminals of said machine, from a source of electromotive force independent of said machine, and in proportion to the current delivered by the machine, said last mentioned excitation normally opposing the first two, the ampere turns produced by said first two excitations when said machine is operating under short circuit conditions being so proportioned as to be substantially equal to the ampere turns of said last mentioned excitation at a predetermined current plus the ampere turns necessary to generate a voltage in said machine to overcome the internal voltage drop in the armature and connections of said dynamo electric machine at the same predetermined current.

8. A system of electrical distribution comprising a line circuit subject to short circuit conditions, a substantially constant speed dynamo electric machine arranged to supply current to said line circuit normally at substantially constant potential, said machine being provided with field windings excited from across the terminals of said machine, from a source of electromotive force independent of said machine, and in proportion to the current delivered by the machine, said last mentioned excitation normally opposing the first two, the ampere turns produced by said first two excitations when said machine is operating under short circuit conditions being so proportioned as to be substantially equal to the ampere turns of said last mentioned excitation at substantially full load current plus the ampere turns necessary to generate a voltage in said machine to overcome the internal voltage drop in the armature and connections of said dynamo electric machine at substantially full load current.

9. A system of electrical distribution comprising a line circuit subject to short circuit conditions, a substantially constant speed dynamo electric machine arranged to supply current to said line circuit normally at substantially constant potential, said machine being provided with field windings, an auxiliary source of electromotive force connected in circuit with one portion of said windings, another portion of said windings being in series with said line circuit and connected to normally oppose said other portion, the ampere turns of said other portion of said windings when said machine is operating under short circuit conditions being so proportioned as to be substantially equal to the ampere turns of said series connected portion at a predetermined current plus the ampere turns necessary to generate a voltage in said machine to overcome the internal voltage drop in the armature and connections of said dynamo electric machine at the same predetermined current.

10. A system of electrical distribution comprising a line circuit subject to short circuit conditions, a substantially constant speed dynamo electric machine arranged to supply current to said line circuit normally at substantially constant potential, said machine being provided with field windings, an auxiliary source of electromotive force connected in circuit with one portion of said windings, another portion of said windings being in series with said line circuit and connected to normally oppose said other portion, the ampere turns of said other portion of said windings when said machine is operating under short circuit conditions being so proportioned as to be substantially equal to the ampere turns of said series connected portion at substantially full load current plus the ampere turns necessary to generate a voltage in said machine to overcome the internal voltage drop in the armature and connections of said dynamo electric machine at substantially full load current.

11. A system of electrical distribution comprising a line circuit subject to short circuit conditions, a substantially constant speed dynamo electric machine arranged to supply current to said line circuit, said machine being provided with field windings, one portion of said windings being in series with said line circuit and connected to normally oppose another portion, means for varying the excitation supplied said other portion to maintain the voltage of said machine substantially constant as the load on said machine varies under normal load conditions, the ampere turns of said other portion of said windings when said machine is not operating under short circuit conditions being so proportioned as to be substantially equal to the ampere turns of said series connected portion at a predetermined current plus the ampere turns necessary to generate a voltage in said machine to overcome the internal voltage drop in the armature and connections of said dynamo electric machine at the same predetermined current.

12. A system of electrical distribution comprising a line circuit subject to short circuit conditions, a substantially constant speed dynamo electric machine arranged to supply current to said line circuit, said machine being provided with field windings, one portion of said windings being in series with said line circuit and connected to normally oppose another portion, means for varying the excitation supplied said other portion to maintain the voltage of said machine substantially constant as the load on said machine varies under normal load conditions, the ampere turns of said other portion of said windings when said machine is not operating under short circuit conditions being so proportioned as to be substantially equal to the ampere turns of said series connected portion at substantially full load current plus the ampere turns necessary to generate a voltage in said machine to overcome the internal voltage drop in the armature and connections of said dynamo electric machine at substantially full load current.

13. A system of electrical distribution comprising a line circuit subject to short circuit conditions, a substantially constant speed dynamo electric machine arranged to supply current to said line circuit, said machine being provided with field windings, excited across the terminals of said machine, from a source of electromotive force independent of said machine, and in proportion to the current delivered by the machine, said last mentioned excitation normally opposing the first two, the ampere turns produced by said first two excitations when said machine is operating under short circuit conditions being so proportioned as to be substantially equal to the ampere turns of said last mentioned excitation at a predetermined current plus the ampere turns necessary to generate a voltage in said machine to overcome the internal voltage drop in the armature and connections of said dynamo electric machine at the same predetermined current, and means for varying the excitation of said machine to maintain the voltage of said machine substantially constant as the load on said machine varies under normal load conditions.

14. A system of electrical distribution comprising a line circuit subject to short circuit conditions, a substantially constant speed dynamo electric machine arranged to supply current to said line circuit, said machine being provided with field windings, excited across the terminals of said machine, from a source of electromotive force independent of said machine, and in proportion to the current delivered by the machine, said last mentioned excitation normally opposing the first two, the ampere turns produced by said first two excitations when said machine is operating under short circuit conditions being so proportioned as to be substantially equal to the ampere turns of said last mentioned excitation at substantially full load current plus the ampere turns necessary to generate a voltage in said machine to overcome the internal voltage drop in the armature and connections of said dynamo electric machine at substantially full load current, and means for varying the excitation of said machine to maintain the voltage of said machine substantially constant as the load on said machine varies under normal load conditions.

15. A system of electrical distribution comprising a line circuit subject to short circuit conditions, a substantially constant speed dynamo electric machine arranged to supply current to said line circuit, said machine being provided with field windings, an auxiliary source of electromotive force connected in circuit with one portion of said windings, means for varying the excitation supplied said portion of said windings to maintain the voltage of said machine substantially constant as the load on said machine varies under normal load conditions, another portion of said windings being in series with said line circuit and connected to normally oppose said first mentioned portion, the ampere turns of said first mentioned portion of said windings when said machine is operating under short-circuit conditions being so proportioned as to be substantially equal to the ampere turns of said series connected portion at a predetermined current plus the ampere turns necessary to generate a voltage in said machine to overcome the internal voltage drop in the armature and connections of said dynamo electric machine at the same predetermined current.

16. A system of electrical distribution comprising a line circuit subject to short circuit conditions, a substantially constant speed dynamo electric machine arranged to supply current to said line circuit, said machine being provided with field windings an auxiliary source of electromotive force connected in circuit with one portion of said windings, means for varying the excitation supplied said portion of said windings to maintain the voltage of said machine substantially constant as the load on said machine varies under normal load conditions, another portion of said windings being in series with said line circuit and connected to normally oppose said first mentioned portion, the ampere turns of said first mentioned portion of said windings when said machine is operating under short circuit conditions being so proportioned as to be substantially equal to the ampere turns of said series connected portion at substantially full load current plus the ampere turns necessary to generate a voltage in said machine to overcome the internal voltage drop in the armature and connections of said dynamo electric machine at substantially full load current.

17. A system of electrical distribution comprising a line circuit subject to short circuit conditions, a substantially constant speed dynamo electric machine arranged to supply current to said line circuit, said machine being provided with field windings, an auxiliary source of electromotive force connected in circuit with one portion of said windings, means for varying the excitation supplied said portion of said windings to maintain the voltage of said machine substantially constant as the load on said machine varies under normal load conditions, another portion of said windings being in series with said line circuit and connected to normally oppose said first mentioned portion, the ampere turns of said first mentioned portion of said windings when said machines is operating under short circuit conditions being so proportioned as to be substantially equal to the ampere turns of said series connected portion at a predetermined current plus the ampere turns necessary to generate a voltage in said machine to overcome the internal voltage drop in the armature and connections of said dynamo electric machine at the same predetermined current, and means for normally reducing the excitation produced by said portion of the field windings in series with said line circuit and to provide substantially full excitation of said series field winding when the line current exceeds substantially the same predetermined current.

18. A system of electrical distribution comprising a line circuit subject to short circuit conditions, a substantially constant speed dynamo electric machine arranged to supply current to said line circuit, said machine being provided with field windings, an auxiliary source of electromotive force connected in circuit with one portion of said windings, means for varying the excitation supplied said portion of said windings to maintain the voltage of said machine substantially constant as the load on said machine varies under normal load conditions, another portion of said windings being in series with said line circuit and connected to normally oppose said first mentioned portion, the ampere turns of said first mentioned portion of said windings when said machine is operating under short circuit conditions being so proportioned as to be substantially equal to the ampere turns of said series connected portion at substantially full load current plus the ampere turns necessary to generate a voltage in said machine to overcome the internal voltage drop in the armature and connections of said dynamo electric machine at substantially full load current, and means for normally reducing the excitation produced by said portion of the field windings in series with said line circuit and to provide substantially full excitation of said series field winding when the line current exceeds substantially full load current.

19. A system of electrical distribution comprising a line circuit subject to short circuit conditions, a substantially constant speed dynamo electric machine arranged to supply current to said line circuit, said machine being provided with field windings, excited across the terminals of said machine, from a source of electromotive force independent of said machine, and in proportion to the current delivered by the machine, said last mentioned excitation normally opposing the first two, the ampere turns produced by said first two excitations when said machine is operating under short circuit conditions being so proportioned as to be substantially equal to the ampere turns of said last mentioned excitation at a predetermined current plus the ampere turns necessary to generate a voltage in said machine to overcome the internal voltage drop in the armature and connections of said dynamo electric machine at the same predetermined current, means for varying the excitation of said machine to maintain the voltage of said machine substantially constant as the load on said machine varies under normal load conditions, and means for normally reducing said portion of the excitation of the said machine which is proportional to the current delivered by the machine and to restore substantially all of said portion of the excitation which is proportional to the current delivered by the machine when the line current exceeds substantially the same predetermined current.

20. A system of electrical distribution comprising a line circuit subject to short circuit conditions, a substantially constant speed dynamo electric machine arranged to supply current to said line circuit, said machine being provided with field windings, excited across the terminals of said machine, from a source of electromotive force independent of said machine, and in proportion to the current delivered by the machine, said last mentioned excitation normally opposing the first two, the ampere turns produced by said first two excitations when said machine is operating under short circuit conditions being so proportioned as to be substantially equal to the ampere turns of said last mentioned excitation at substantially full load current plus the ampere turns necessary to generate a voltage in said machine to overcome the internal voltage drop in the armature and connections of said dynamo electric machine at substantially full load current, means for varying the excitation of said machine to maintain the voltage of said machine substantially constant as the load on said machine varies under normal load conditions, and means for normally reducing said portion of the excitation of said machine which is proportional to the current delivered by the machine and to restore substantially all of said portion of the excitation which is proportional to the current delivered by the machine when the line current exceeds substantially the full load current.

21. In a system of distribution, a dynamo electric machine and exciting means therefor comprising a shunt connected winding and a differential series winding, and means responsive to the voltage of the system for regulating the strength of the shunt winding, characterized by the fact that said regulating means is arranged to be rendered inoperative to increase the shunt excitation under full load electrical conditions of said machine.

22. A system of electrical distribution comprising a line circuit subject to wide and sudden changes in load, a substantially constant speed dynamo electric machine adapted to supply current to said line circuit, said machine being provided with a shunt winding and a differential winding adapted to carry line current, an auxiliary source of electromotive force connected in circuit with said shunt winding to assist the flow of current therein, means for regulating the strength of said shunt winding in response to voltage changes of the system, and means to limit the operation of said regulating means to limit the output of said machine.

23. A system of electrical distribution comprising a line circuit subject to wide and sudden changes in load, a substantially constant speed dynamo electric machine adapted to supply current to said line circuit, said machine being provided with a shunt winding and a differential winding adapted to carry line current, an auxiliary source of electromotive force connected in circuit with said shunt winding to assist the flow of current therein, means for regulating the strength of said shunt winding in response to voltage changes of the system, means to limit the operation of said regulating means, and means arranged to increase the strength of said series winding upon a predetermined increase of line current.

24. A system of electrical distribution comprising a line circuit subject to wide and sudden changes in load, a dynamo electric machine adapted to supply current to said line circuit, a shunt winding for said machine, excitation controlling means comprising a differential winding adapted to carry line current, an auxiliary source of electromotive force arranged to assist the building up of the field flux, and means responsive to voltage changes of the system for regulating the strength of said shunt winding, and means arranged to cooperate with said excitation controlling means to reduce the excitation when the current output exceeds a predetermined value.

25. In a system of electrical distribution, a dynamo electric machine adapted to be connected to a circuit subject to wide and sudden changes in load, shunt and differential series exciting windings for said machine, an auxiliary source of electromotive force connected in circuit with said shunt winding, voltage responsive means for regulating the effect of said auxiliary source of electromotive force, means arranged manually to shunt a portion of said series field winding, and means responsive to the current output of said machine to control the operation of said shunting means.

26. A system of electrical distribution comprising a line circuit subject to wide and sudden changes in load, a substantially constant speed dynamo electric machine adapted to supply current to said line circuit, a shunt winding and a differential series winding for said machine, an auxiliary source of electromotive force connected in circuit with said shunt winding to assist the flow of current therein, means for varying the effect of said auxiliary source of electromotive force, means for controlling said varying means in response to the voltage of said machine, a contactor arranged normally to shunt a portion of said series winding, and a coil connected to carry line current arranged to maintain said contactor open while the current exceeds a predetermined value.

In witness whereof, I have hereunto set my hand this 12th day of June, 1922.

CARL M. GILT.